United States Patent
Vernon

(10) Patent No.: US 7,116,636 B2
(45) Date of Patent: Oct. 3, 2006

(54) DATA RATE ADJUSTER USING TRANSPORT LATENCY

(75) Inventor: Stephen K. Vernon, Columbia, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 812 days.

(21) Appl. No.: 09/854,623

(22) Filed: May 15, 2001

(65) Prior Publication Data

US 2002/0172153 A1   Nov. 21, 2002

(51) Int. Cl.
*H04L 12/56* (2006.01)

(52) U.S. Cl. ...................................... 370/232

(58) Field of Classification Search ................ 370/229, 370/230, 230.1, 232, 233, 234, 235, 389, 370/412, 413
See application file for complete search history.

(56) References Cited

U.S. PATENT DOCUMENTS

| | | | |
|---|---|---|---|
| 5,802,106 A | 9/1998 | Packer | |
| 6,018,516 A | 1/2000 | Packer | |
| 6,038,216 A | 3/2000 | Packer | |
| 6,046,980 A | 4/2000 | Packer | |
| 6,115,357 A | 9/2000 | Packer et al. | |
| 6,118,765 A | 9/2000 | Phillips | |
| 6,119,235 A | 9/2000 | Vaid et al. | |
| 6,205,120 B1 | 3/2001 | Packer et al. | |
| 6,208,640 B1 | 3/2001 | Spell et al. | |
| 6,732,168 B1 * | 5/2004 | Bearden et al. | 709/223 |
| 6,912,225 B1 * | 6/2005 | Kohzuki et al. | 370/412 |
| 2002/0110134 A1 * | 8/2002 | Gracon et al. | 370/412 |

* cited by examiner

*Primary Examiner*—Derrick Ferris
(74) *Attorney, Agent, or Firm*—Tarolli, Sundheim, Covell & Tummino LLP

(57) ABSTRACT

An apparatus and method for reducing the data rate in a network using a delay processor. Since an increase in the data rate can overwhelm parts of the network hardware, such as a router, a delay processor is introduced so that data is delayed by a fixed amount so as to lower the data rate. A configuration table determines the amount of delay. A slowly changing amount of delay can be used in place of a fixed amount.

14 Claims, 3 Drawing Sheets

DATA RATE ADJUSTER USING TRANSPORT LATENCY

This invention was made with Government support under Contract No. MDA 904-97-C-0613 awarded by the Maryland Procurement Office. The Government has certain rights in this invention.

BACKGROUND OF THE INVENTION

1. Field of the Invention

The present invention relates to a method and apparatus for controlling the data rate in a network and more particularly to a method and apparatus for controlling the data rate between two processors on an Internet protocol network by adding a fixed latency 2. Discussion of the Background While a number of different types of network systems are in use, one of the common arrangements is a network based on the TCP/IP (transmission control protocol/internet protocol). This combined protocol is used to implement the Internet and also private networks such as Intranets. This arrangement provides for reliable delivery of sequenced packets of information across the Internet. An acknowledgment system is utilized so that the sending device will know that the data has been received. A timing mechanism can be used so that if an acknowledgment is not received within a certain amount of time, the packet is retransmitted. This particular system is well known and widely used.

An example of such a system is shown in FIG. 1 where an Internet protocol network 10 is shown connecting a client processor 12 with various server processors 14 and 16. The network includes routers 18 and 20 which control the flow of data on the network. One problem which can occur is the overloading of the router which causes it to crash when the data rate increases temporarily beyond the capability of the router. This problem has sometimes been addressed by attempting to control the data rate in the network.

U.S. Pat. No. 6,115,357 which is assigned to Packeteer, Inc., describes the use of TCP/IP protocols and their use in networks. This device attempts to pace the data flow by arranging data transmission over a period of time after determining a round trip time for the data.

U.S. Pat. No. 6,046,980, which is assigned to the same company, utilizes packet parsing based on content. That is, the packets are classified and a particular rule is applied according to their classification.

U.S. Pat. No. 6,038,216, also assigned to Packeteer, Inc. shows data rate control without data rate supervision. Latency is added to the acknowledgment packet and the size of the flow control window is adjusted to control the data rate.

U.S. Pat. No. 6,119,235 shows a method for quality of service management where the round trip time of the data is determined and delaying transmission of a receive acknowledgment signal when the bit rate is greater than a bit rate limit.

Similarly, other patents describe the measurement of the data flow in order to control in some fashion the data rate in a network.

While various solutions are possible for this type of problem, they often involve making major changes of some kind in either the client processor or the server processor which may be difficult and expensive. It would be advantageous to correct the problem merely by making adjustments of some sort in the network itself rather than requiring changes to either the client processor or server processors.

SUMMARY OF THE INVENTION

Accordingly, the present invention provides a method for adjusting the data rate in a network by adding a fixed delay thereto.

The present invention also provides an apparatus for delaying packet transport which reduces the data rate in a network by inserting a fixed delaying device.

The present invention also provides a system for adding fixed transport latency to selected data in a network in order to adjust the data rate downwardly in a network situation.

The present invention further provides a method for preventing a data rate overload by adding transport latency to the network which is determined by a low pass filtered data rate.

The present invention further provides an apparatus for adjusting the transport latency in a network by adding a delay device thereto whose delay is determined by a low pass filter of the data rate.

Briefly, this is accomplished by adding a delay processor to the network which causes a fixed delay of the data so that the data rate does not become too high, or to add a delay determined by a low pass filtered data rate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
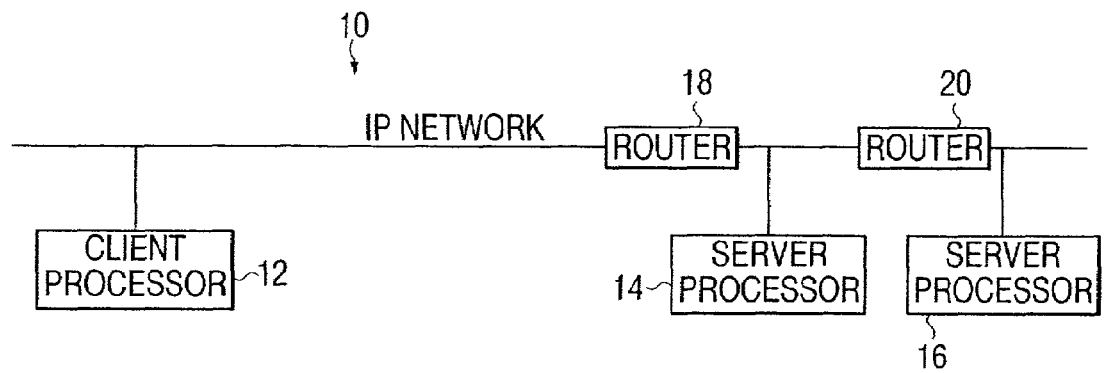
FIG. 1 is a block diagram showing a prior art network arrangement.

Referring now to the drawings, wherein like reference numerals designate identical or corresponding parts throughout the several views, and more particularly to FIG. 1 thereof, wherein a prior art network is shown. As described above, the network 10 has connected thereto a number of processors including a client processor 12 and server processors 14 and 16. The network has incorporated therein routers 18, 20 or other similar devices which control the flow of the data in the network. At such times that the data flow rate of the data stream increases temporarily, it is possible that the network will be overloaded or the router will be overloaded and thus will crash. The crash produces a number of deleterious effects including at least a temporary interruption in the data stream. Many of the times the increase in the data stream is driven by the TCP/IP algorithm searching for the maximum possible rate on the network. In the past, attempts at solving these problems were aimed at the client or server processors. However, for the network providers, this is often a difficult or expensive proposition. Instead, it is desirable to provide the network with some means of handling this problem.

Figure 2:
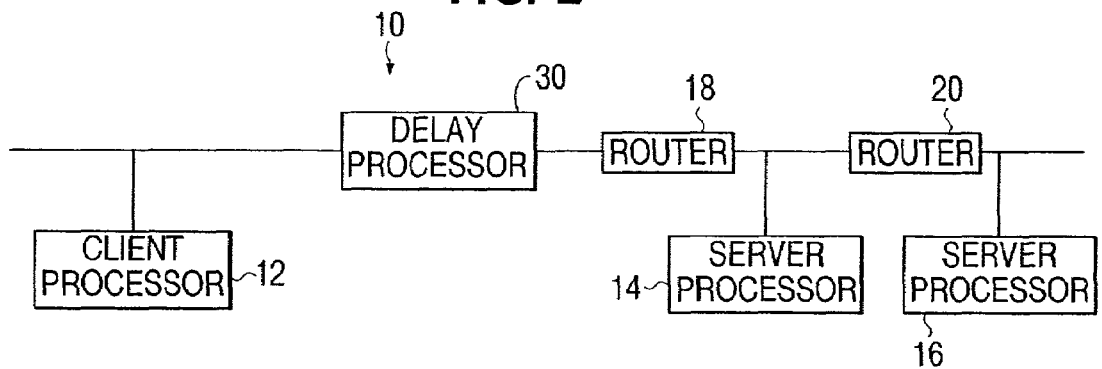
FIG. 2 is a block diagram showing a network arrangement of the present invention.

FIG. 2 is a block diagram which shows a network onto which a delay processor 30 has been added to solve this problem. In this system, data still flows from the client processor to the server processor and vice versa. However, the data is caused to flow through the delay processor when traveling in either direction. The delay processor does nothing but merely passes the data packets back to the network, but with a fixed delay. Using added delay to increase network latency limits the maximum TCP/IP algorithm rate to a value the network can tolerate.

The particular amount of delay is either calculated in advance or determined in advance by experimentation. Once this has been set, it should not be necessary to adjust it, at least in the short run. As the latency or round trip delay increases, the data rate in the network will decrease. Thus, it is possible to control the data rate in the network independent of the client processor or server processors. This latency can be inserted in either direction or both directions if desired. By adding a fixed latency, an output stream is produced whose bandwidth will vary. It is also possible to specify by a packet selection list that certain packets will be delayed while others are not. In reality, the TCP/IP system will adjust the bandwidth based on the latency so that adding the fixed latency produces the required bandwidth adjustment. Thus, once the fixed delay is added the client TCP/IP system will handle the actual work of adjusting the data rate. While this will mean that if the latency does increase due to external network considerations, then the bandwidth will go lower than intended. However, it will still prevent a network traffic overload, which is the main purpose of this system.

Using a fixed delay avoids having to know the specific details of the TCP/IP protocol in use. This method will be successful with the newer TCP/IP protocol algorithm variations now coming into use. Implementation of a fixed delay is a simple operation thus allowing for increased processing capacity or reduced hardware requirements as appropriate over the more complex methods The delay processor includes memory buffers into which the data is placed. The processor includes a clock circuit for generating timing signals and a controller for determining how long the data should remain in the buffers. The amount of delay is stored in a configuration table. The configuration table may be reset through the operators of the network. However, this will be done manually after observing the operation of the network, and it would not be adjusted on a short term basis by the instantaneous data rate. Data is placed into memory buffers and stored there for a set amount of time before being released. Thus, the round trip latency or the time it takes to make the delay, is increased by an amount which depends on the configuration table. Since TCP/IP is a reliable protocol which uses a limited capacity re-transmit buffer, the data rate will decrease as the latency increases. By utilizing this process, the latency can be increased in the data stream in either direction or both directions.

When utilizing this system, the problems of traffic overloads or crashing routers is reduced substantially. For example, when an office processor backup program achieves a data rate that overloads the office infrastructure router, in the past, the router crashed due to the increase in data rate. By adding latency using the delay processor, the data rate is reduced and crashing does not occur.

The delay processor may be a Sun Microsystems Unix Processor including a program which fixes the length of time the data should remain in a memory buffer before being returned to the data stream.

Figure 3:
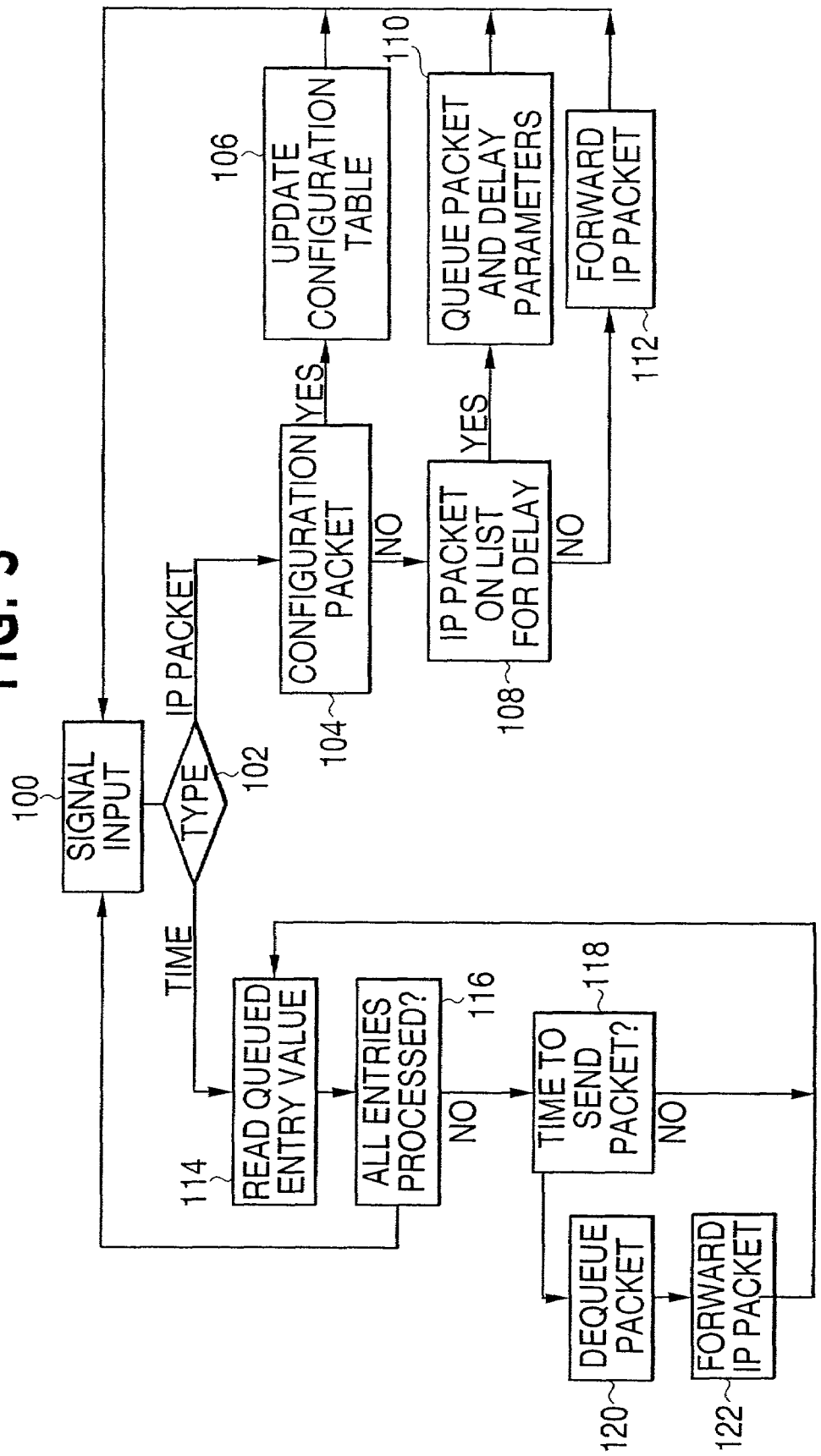
FIG. 3 is a flow chart showing the algorithm used to control the delay processor.

FIG. 3 is a flowchart which indicates the algorithm for controlling the movement of the data into and out of the memory buffers in the delay processor. Step 100 indicates the arrival of a signal, either a regularly occurring clock signal or the arrival of a data packet. Upon arrival, it is determined whether this is a clock signal or a data packet as indicated in step 102. If a new data packet has arrived, step 104 determines whether this is a configuration table packet or not. If it is, it is used to update the configuration table as indicated in step 106 to change the amount of delay and/or the packet selection list and the processor returns to step 100 to await the arrival of another signal. If it is not a configuration table packet, the processor determines whether the data packet is one to be delayed. The packet selection list indicates that certain packets are delayed and others not. This occurs in step 108. If the packet is not to be delayed, the packet is forwarded as indicated in step 112 and the processor returns to step 100 to await the next signal. If the packet is to be delayed, the packet is queued and placed in a memory buffer and the specific delay parameters are determined from the table in step 110.

If the signal input is a regularly occurring clock signal as determined in step 102, the processor as indicated in step 114 reads whether there are any packets stored in the memory buffers. If all the packets have been processed so that the buffers are empty as indicated in step 116, the processor awaits the arrival of the next signal at step 100. If some packets remain in the buffers, the processor proceeds to step 118 which determines whether the first stored packet has reached its time limit. If not, the processor returns to step 114, to look at the next stored packet. If it is time to send the packet, the processor in step 120 removes the packet from the buffer and forwards the packet in step 122. The processor then returns to step 114 to look at the next stored packet.

When the packet is originally stored in step 110, the configuration table is consulted to determine the specified amount of time that the packet should remain in the memory buffers. The time at which it may be released is stored along with the data so that when clock signals are received, each packet may be reviewed to determine if it should be released.

While the invention described above utilizes a fixed delay which is only changed in the configuration table by manual operation of the operator, it also would be possible to utilize this system by measuring the data rate in a fashion somewhat similar to that of the prior art, but instead of utilizing the instantaneous rate itself to control the flow, rather the data rate is low pass filtered to provide a very slow change to the configuration table so that the delay may be slowly adjusted over a long period of time. This would avoid the necessity of the operator to manually change the configuration table but at the same time still gains the advantages of applying a fixed delay. The operation would be different from the prior art which uses an instantaneous measurement and change and in fact the data packets would operate in the same fashion as a fixed configuration table arrangement because of the slow change relative to the packet time. Using a slowly varying delay value avoids being misled by rapidly changing network latency conditions due to network overload.

Figure 4:
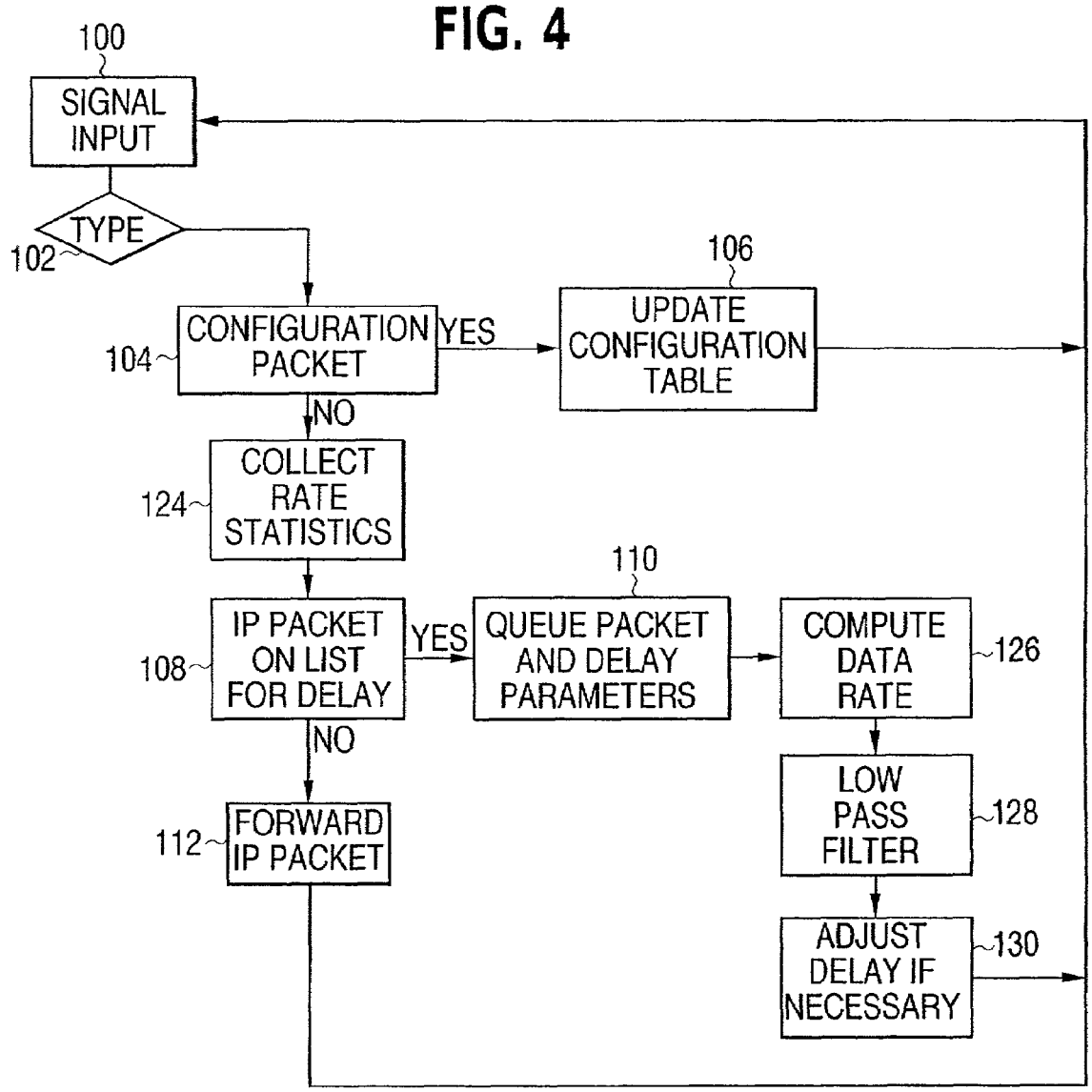
FIG. 4 is a flow chart showing the algorithm used in a second embodiment.

FIG. 4 is a flow chart of the algorithm which should be followed for this modified arrangement. Only the right side of FIG. 3 is changed and accordingly the left side is not shown in FIG. 4. When an IP packet is received and typed in step 102 it is passed to determine if it is a configuration packet or not. If it is a manual change, it is updated in step 106 just as in FIG. 3. If it is not, the system proceeds to collect data rate statistics. If the IP packet is one of those which is listed for being delayed as determined in step 108, it is queued in step 110 just as in FIG. 3. However, new step 126 then computes the data rate based on the statistics collected in step 124. The data rate is low pass filtered in step 128 and the delay which is queued along with the packet is then adjusted if it is necessary. The system then returns to step 100 just as in FIG. 3. If the packet is not on the list for delay, it is forwarded in step 112 just as in FIG. 3.

Thus, the difference between the arrangement of FIG. 3 and that of FIG. 4 is that the second embodiment collects the rate statistics computes the data rate and low pass filters it. The delay is then adjusted by this amount when the packet is placed in a queue.

Other configurations of the data rate computation could also be envisioned. For example if it is desired to not rely on manual operation at all, steps 104 and 106 can be eliminated and the data rate computation could be placed there with a default value set in the system. Also, it would be possible to move steps 126, 128 and 130 to branch off of step 124 so that the data rate is computed filtered and adjusted in parallel to the branch including step 106. In this arrangement the data rate in the configuration table is adjusted separately from the queuing of the individual packet.

Thus, it is seen that it is possible to remove a potential traffic overload or crash problem in the network by deliberately adding a delay to the data stream which is otherwise not necessary. In doing so, the data rate is reduced to the point that the routers and other hardware in the network are not overwhelmed. This idea is contrary to the usual view of increasing data rates as much as possible. Thus, this acts as a type of data rate averaging device which avoids temporary increases to provide better data flow.

Numerous additional modifications and variations of the present invention are possible in light of the above teachings. It is therefore to be understood that within the scope of the appended claims, the invention may be practiced otherwise than as specifically described herein.

The invention claimed is:

1. A method of controlling a data rate in a network, comprising:
   placing data packets into a data stream in a network;
   routing said data stream through a delay device;
   receiving the data rate as an input to a low pass filter;
   delaying the selected data of the data stream in said network by storing the selected data in memory buffers for a variable delay amount to control the data rate to increase latency of the network; and
   determining the amount of time the selected data is stored in the memory buffers based on an amount of delay stored in a configuration table, the amount of delay being variably controlled by an output of the low pass filter.

2. The method according to claim 1, wherein the variable delay amount is stored in the configuration table, and said delay device consults the configuration table to determine when to release the selected data from the memory buffers.

3. The method according to claim 1, wherein said delay causes a change in round trip latency for said selected data.

4. The method according to claim 1, wherein said network includes at least one client processor, at least one server processor, at least one network router and a delay processor.

5. The method according to claim 1, further comprising determining the selected data of the data stream by employing a packet selection list that indicates which of the data packets are to be the delayed selected data.

6. The method according to claim 1, further comprising updating the configuration table to change the amount of delay stored in the configuration table upon the delay device receiving a configuration table packet.

7. The method according to claim 1, further comprising storing a release time in the memory buffers along with the selected data, the release time corresponding to a time at which the selected data is to be released from the memory buffers.

8. An apparatus for controlling a data rate in a network, comprising:
   at least one first processor connected to said network;
   at least one second processor connected to said network; and
   a delay processor for controlling the data rate in said network, the delay processor comprising a low pass filter operative to receive the data rate as an input, the delay processor being operative to store data packets in a plurality of memory buffers for a variable amount of time and releasing the data packets after the variable amount of time to increase latency of the network, the delay processor comprising a clock circuit and a controller operative to determine the fixed amount of time the data packets are stored in the memory buffers based on an amount of delay stored in a configuration table, the amount of delay being variably controlled by an output of the low pass filter, the controller being further operative to store a release time in the memory buffers along with the data packets, the release time corresponding to a time at which the data packets are to be released from the memory buffers by the controller.

9. The apparatus according to claim 8, wherein said network further comprises at least one router.

10. The apparatus according to claim 8, wherein the variable amount of time is stored in the configuration table, the delay processor consulting the configuration table to determine when to release the data packets from the memory buffers.

11. The apparatus according to claim 8, wherein the delay processor comprises a packet selection list that indicates which of the data packets are to be delayed through the delay processor.

12. An apparatus for controlling a data rate in the network, comprising:
   at least one first processor connected to said network;
   at least one second processor connected to said network; and
   a delay processor for controlling the data rate in said network, said delay processor delaying data in said network by storing the data in memory buffers and releasing the data after a delay, the amount of the delay being variably controlled by the output of a low pass filter, where the low pass filter receives the data rate as an input, the delay processor comprising a clock circuit and a controller operative to determine the amount of time the data is stored in the memory buffers based on the variably controlled amount of delay being stored in a configuration table, the controller being further operative to store a release time in the memory buffers along with the data, the release time corresponding to a time at which the data is to be released from the memory buffers by the controller.

13. The apparatus according to claim 12, wherein said network further comprises at least one router.

14. The apparatus according to claim 12, wherein the delay processor comprises a packet selection list that indicates which of the data is to be delayed.

* * * * *